May 28, 1963  J. ENGELMANN  3,091,716
WELL-TYPE IONISATION CHAMBER
Filed June 1, 1960

3,091,716
WELL-TYPE IONISATION CHAMBER

Jacques Engelmann, Paris, France, assignor to Commissariat à l'Energie Atomique, Paris, France
Filed June 1, 1960, Ser. No. 33,259
Claims priority, application France June 8, 1959
7 Claims. (Cl. 313—146)

Cylindrical ionisation chambers pierced with a central hole co-axial with the cylinder are frequently used for measuring the activity of radioactive sources, the source being introduced through the hole. These chambers are generally known by the name of well-type chambers or "$4\pi\gamma$ chambers."

They are used for measuring $\gamma$-emitting sources, and possibly pure $\beta$-emitting sources, ionisation in the chamber then being produced by $\beta$-ray retarding radiation.

The said well-type chambers usually consist of a metal screen enclosing a system of three concentric cylindrical electrodes; a collector electrode surrounded by the high-voltage electrode.

In order to facilitate measurement of the activity of samples, it is advantageous for this type of chamber to give a response (in ionisation current per millicurie) which is practically independent of the dimensions of the source, and, within certain limits, of the position of the latter. If this is in fact the case, measurements are correct even if the geometrical arrangement of the source and the chamber is not identical, at the instant of measurement, with that which existed at the time of calibration, and the latter remains valid.

In order to study the characteristics of such a chamber, the central well is scanned with a point source, thus determining a volume of uniform sensitivity within which the ionisation current remains constant whatever the position of the source.

The present invention relates to a well-type ionisation chamber which enables the volume of uniform sensitivity in such chambers to be considerably increased, this being so whatever the radiation energy of the source.

The said ionisation chamber is essentially characterised in that a well-type ionisation chamber whereof the high- and low-voltage electrodes are cylinders co-axial with the well comprises means for making the inter-electrode distance variable along the axis of the well so as to make the said distance a minimum in the vicinity of the central region of the chamber.

The means used may, for example, take the form of one or more collars of conductive material capable of being attached to the electrodes in positions which may be adjusted at will, the said collars being situated within the ionisation volume bounded by the electrodes.

In other embodiments of the invention, at least one of the electrodes exhibits a curved profile along the axis of the chamber, thus leading, according to the invention, to an inter-electrode distance which is variable along the said axis.

A non-limitative example of use of the well-type ionisation chamber to which the invention relates will be described hereinafter with reference to the appended diagrammatic FIGURE 1.

Figures 1, 2:
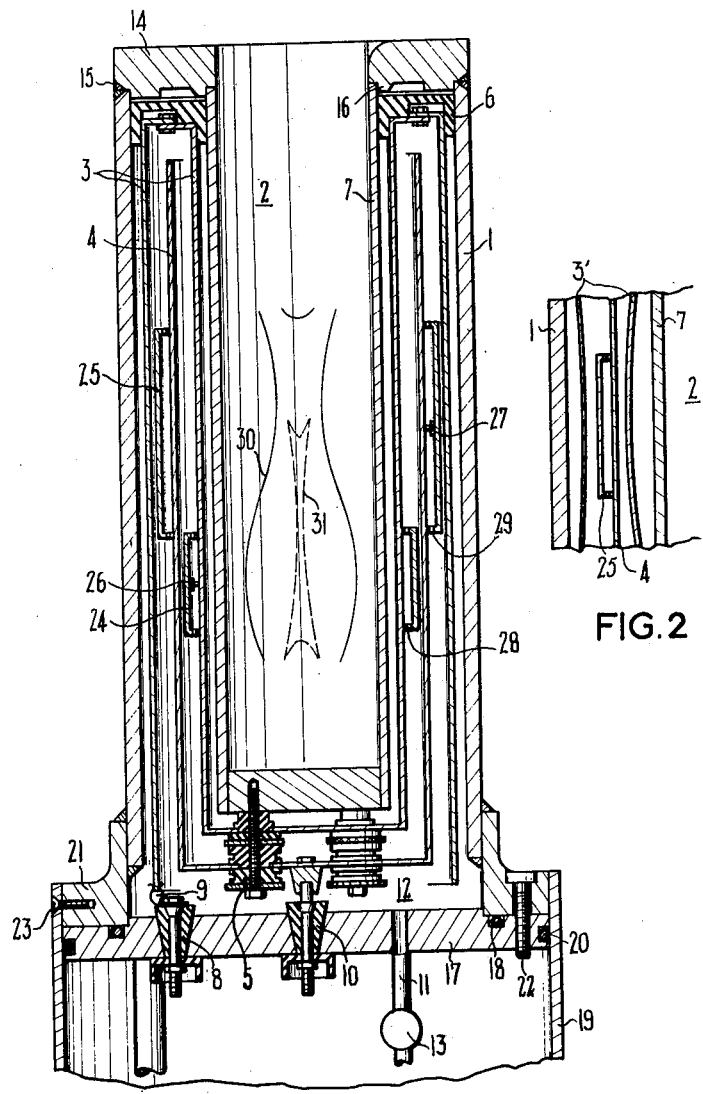
FIGURE 1 is a section along the axis of a well-type ionisation chamber improved in accordance with the invention.
FIG. 2 is a partial cross-section on the axis of the ionisation chamber of another embodiment of the present concept.

FIGURE 1 shows the steel envelope of the screen 1 of the ionisation chamber comprising the central well 2 in which are examined the radioactive samples which it is desired to calibrate; the cylindrical electrodes 3 and 4 are also shown, the collector electrode 4 being entirely inside the high-voltage electrode 3.

These two electrodes 3 and 4 are held by insulators such as 5. In addition, the electrode 3 is held at the top of the well in an insulator 6, in order to prevent it from coming into contact, during handling operations, with the wall 7 of the well 1 which is at earth potential. The electrode-insulating path 8 enables high voltage to be fed to the electrode 3 via a contact strip 9.

The insulating path 10 enables the pre-amplifier not illustrated in FIGURE 1 to be connected to the collector electrode 4. An orifice 11 enables the inter-electrode space 12 to be emptied and filled with argon under pressure via the valve 13.

A fluid-tight seal between the body 1 of the ionisation chamber and the cover 14 is provided by welding at 15 and 16. A fluid-tight seal between the body and the lower plate 17 is provided by a packing 18. A fluid-tight seal between the plate 17 and the base 19 is provided by the packing 20.

The flange 21 in which the body 1 of the chamber terminates at the bottom is attached to the plate 17 by screws such as 22, and to the base 19 by screws such as 23.

According to the invention, two annular collars 24 and 25, placed in position on the electrodes 3 and 4 respectively with the aid of grub-screws 26 and 27, enable the space between the electrodes 3 and 4 to be varied in the central zone of the chamber. The collars 24 and 25 are pierced with a series of orifices such as 28 and 29, enabling pressure or suction to be set up in the annular internal zone which they bound.

In the example shown in FIGURE 1 the electrodes 3 and 4 and the two sliding collars 24 and 25 are made of brass. In order to attain the desired object, namely the greatest possible volume of uniform sensitivity at the centre of the chamber, the position of the collar 25 is adjusted in successive approximations. This first coarse adjustment having been made, fine adjustment is carried out by adjusting the position of the collar 24. These two adjustments, which are performed while moving a point source of constant intensity in the central well 2, are necessary in developing a prototype, it being understood that the same results may be obtained in all other chambers of the same type merely by reproducing the same geometry.

In the example shown in FIGURE 1, the chamber is 30 cm. in length, and the internal and external diameters are 6.5 cm. and 13 cm. respectively. The supply voltage is 200, and the zone of uniform sensitivity within $\pm 1\%$ is illustrated by the curve 30. For the same chamber not equipped with the collars 9 and 10, the curve of uniform sensitivity would be reduced to the curve 31 shown in dashed line.

FIG. 2 is a partial sectional view of an ionisation chamber showing another embodiment of the present invention where one of the electrodes has a curved profile. Like parts in FIGS. 1 and 2 are designated by the same reference characters. In FIG. 2 the low tension electrode 4 is cylindrical and supports ring 25 while the two walls of the high tension electrode 3' have a curved profile.

The well-type chamber to which the invention relates may be used in chambers of the type hereinbefore described, that is to say comprising a screen enclosing the electrode system, filled with a gas (air, rare gas, etc.) at any pressure, and associated with an electrical measuring device. It is also applicable to chambers without any external screen, and inter alia to chambers of the so-called "capacity" type, in which the device for measuring ionisation current consists in applying a known potential difference between the collector electrode and the external envelope which serves as the high-voltage electrode, placing the source to be measured in the chamber for a known time and measuring the residual voltage between the electrodes; the ionisation current due to the source may, moreover, be deduced from a knowledge of the capacity of the chamber.

What is claimed is:

1. A well-type ionisation chamber comprising a spaced double-walled cylindrical body forming a well, a plate mounting for said body, a fluid seal between said body and said plate, a cylindrical high-voltage electrode, a cylindrical low-voltage electrode, said electrodes being spaced from each other and coaxial with and spaced from and between said walls, movable means for varying the distance between said electrodes along the axis of said body with minimum distance in the vicinity of the central region of said body, means for rigidly securing said electrodes with respect to said walls of said body, fluid-tight electrical connections through said plate for said electrodes and an ionizable gas sealed within said spaced double walls.

2. A well-type ionisation chamber as described in claim 1, said means for varying the distance between said electrodes including at least one collar of conductive materials secured to one of said electrodes and means for adjusting the position of said collar on said electrode, said collar being between said electrodes.

3. A well-type ionisation chamber as described in claim 1, at least one of said electrodes having a curved profile along the axis of said body comprising said means for varying the distance between said electrodes.

4. A well-type ionisation chamber as described in claim 1 including an insulating piece holding the top of said high-voltage electrode and an insulator supporting the bottom of said high-voltage electrode.

5. A well-type ionisation chamber as described in claim 1 including an insulator supporting said low voltage electrode.

6. A well-type ionisation chamber as described in claim 1 wherein said fluid-tight electrical connections include fluid-tight conical insulators clamped to said plate.

7. A well-type ionisation chamber as described in claim 1 including a base and toroid packings between said body and said plate and between said plate and said base.

References Cited in the file of this patent

UNITED STATES PATENTS

| | | |
|---|---|---|
| 2,227,829 | Hansell | Jan. 7, 1941 |
| 2,919,370 | Giannini | Dec. 29, 1959 |